(No Model.)

C. L. HOUGHTON.
BICYCLE FRAME.

No. 566,861. Patented Sept. 1, 1896.

Witnesses
G. W. Stipek
Willie Eck

Inventor
Charles L. Houghton
By James Shepard
Atty.

UNITED STATES PATENT OFFICE.

CHARLES L. HOUGHTON, OF NORTHAMPTON, MASSACHUSETTS, ASSIGNOR OF TWO-THIRDS TO JOHN L. WOODRUFF, OF WESTFIELD, AND WASHINGTON I. FOX, OF WHATELY, MASSACHUSETTS.

BICYCLE-FRAME.

SPECIFICATION forming part of Letters Patent No. 566,861, dated September 1, 1896.

Application filed July 26, 1895. Serial No. 557,184. (No model.)

*To all whom it may concern:*

Be it known that I, CHARLES L. HOUGHTON, a citizen of the United States, residing at Northampton, in the county of Hampshire and State of Massachusetts, have invented certain new and useful Improvements in Bicycle-Frames, of which the following is a specification.

My invention relates to improvements in bicycle-frames; and the chief object of my improvement is to more conveniently adjust the saddle-support for throwing the saddle to different heights.

Figure 1:
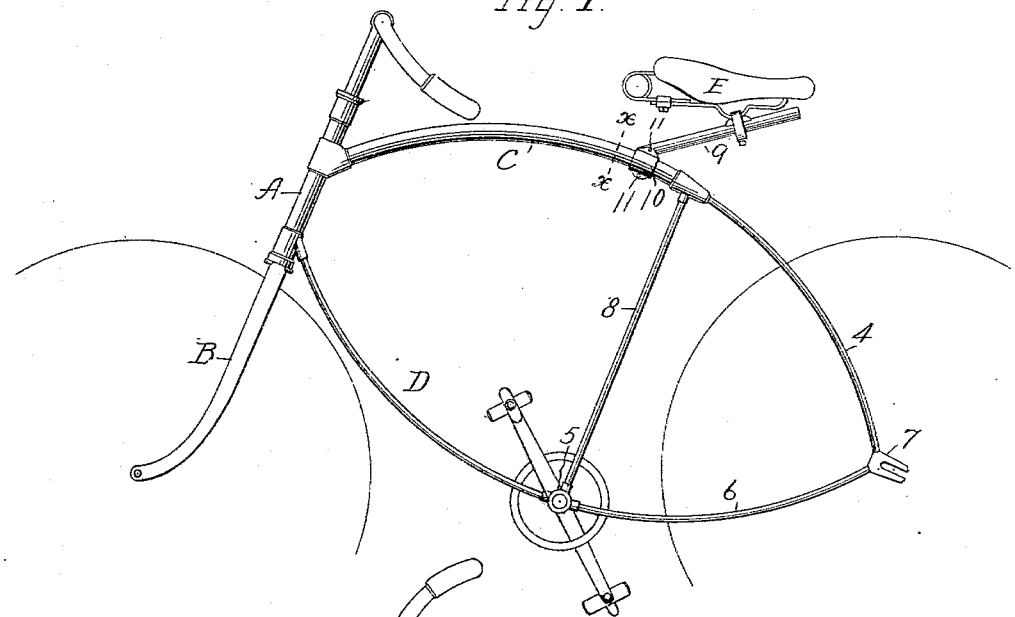
Figure 2:
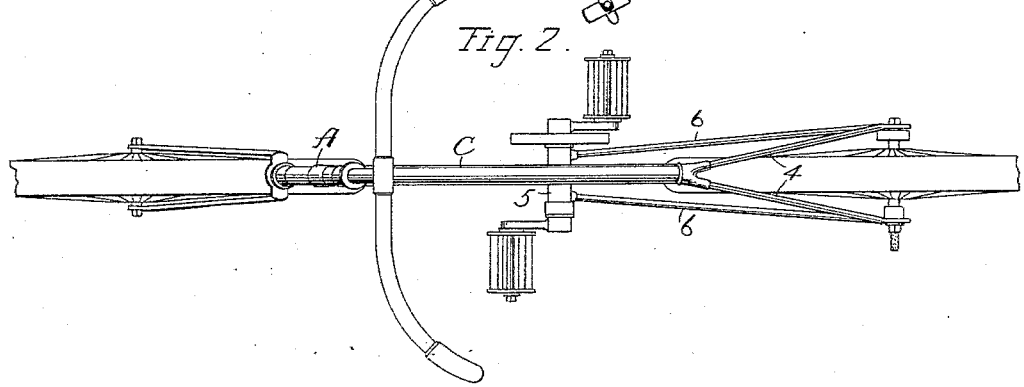
Figure 3:
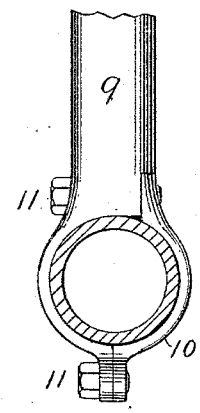

In the accompanying drawings, Figure 1 is a side elevation of my bicycle-frame. Fig. 2 is a plan view of the same properly mounted upon wheels, the saddle and saddle-support being removed; and Fig. 3 is a transverse section of the upper part of the frame on the line $x\ x$.

A designates the front end of the frame, in which is journaled the usual fork B for carrying the front wheel.

C designates the upper bar or back, which is of a curved form, as shown in side view, and at the rear end of which is the fork or double bars 4 for the rear wheel. The lower part of the frame is curved in like manner and extends as one bar D from the front end A to the crank-shaft bearings 5, and from said bearings the bars 6 extend to the ears 7, for attachment to the rear wheel. A cross rod or bar 8 is arranged near the middle of the frame for a vertical support, as shown. The several parts form a truss or frame which is parabolic in shape, as seen in side view, thereby making a neat, strong, and somewhat elastic frame. It should be noted that the rear ends of the upper and lower parts of the frame meet at an angle, as seen in side view, instead of forming a continuous curve like the end of an ellipse, and therefore the line of strain between the rear wheel and crank-shaft comes substantially or very nearly lengthwise to these parts of the frame, whereby the frame is very rigid as to said strains. The curved bar C, which is eccentric to the crank-shaft, also furnishes a means for changing the height of the saddle relatively to the crank-shaft when the saddle is adjusted lengthwise upon said bar. While I prefer to employ a frame that is parabolic in side view, as shown, the manner of adjusting the saddle-support by sliding it lengthwise on the eccentric curved bar would be the same as at present, if all of the frame excepting the bar C were formed of straight rods or bars.

9 designates the saddle-support or bracket, which consists of an inclined rod or pipe, having at its lower end suitable means for fastening it in different positions upon the curved bar C. I prefer to form a clip 10 at the lower end of said support, said clip being provided with bolts 11, by means of which the saddle-support can be clamped and unclamped for sliding longitudinally on the bar C and then fastened at any desired portion thereon. The saddle E may be of any desired construction and provided with means for adjustably securing it on the saddle-support 9 in any ordinary manner. By loosening the clip 10 and slipping it along upon the curved bar C the eccentric saddle-support may be adjusted to any desired position toward or from the front wheel, at the same time, by reason of the curve in the bar, changing the angle of inclination on the saddle-support 9, so as to adjust the height of the saddle as well as its position longitudinally on the frame. By means of both adjustments, that is, adjusting the saddle-support on the curved bar and adjusting the saddle on the saddle-support, I can vary the height of the saddle relatively to the crank-shaft and still have the saddle occupy substantially the same relative position thereto from front to rear.

While I have shown and described a specific form of clip for fastening and unfastening the saddle-support to adjust it longitudinally on the curved bar, I do not wish to confine myself to this specific construction of fastening, as other known means of adjustably securing analogous parts in place may be employed as an equivalent for the specific form of clip herein shown.

I claim as my invention—

The combination of a bicycle-frame having a crank-shaft bearing and at its forward part an upper bar curved eccentrically to said bearing, the saddle-support 9 adjustably secured upon said eccentrically-curved bar, and the saddle adjustably secured on said saddle-support, whereby the height of the saddle relatively to the crank-shaft bearing may be adjusted without varying its relative position thereto from front to rear substantially as described.

CHARLES L. HOUGHTON.

Witnesses:
C. C. LEWIS,
A. F. NUTTING.